United States Patent
Shao et al.

(10) Patent No.: US 9,583,971 B2
(45) Date of Patent: Feb. 28, 2017

(54) ENERGY-SAVING AND ENVIRONMENT-FRIENDLY DEVICE FOR COMMUNICATION SYSTEM EQUIPMENT

(71) Applicant: ZTE Corporation, Shenzhen, Guangdong (CN)

(72) Inventors: Liqun Shao, Shenzhen (CN); Hong Tian, Shenzhen (CN); Tianpeng Zhang, Shenzhen (CN); Zhifeng Zhang, Shenzhen (CN); Bin Liu, Shenzhen (CN); Junping Cheng, Shenzhen (CN); Gang Wang, Shenzhen (CN); Fei Yu, Shenzhen (CN); Liguo Li, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 155 days.

(21) Appl. No.: 14/416,985

(22) PCT Filed: Jul. 25, 2013

(86) PCT No.: PCT/CN2013/080146
§ 371 (c)(1),
(2) Date: Jan. 23, 2015

(87) PCT Pub. No.: WO2014/026534
PCT Pub. Date: Feb. 20, 2014

(65) Prior Publication Data
US 2015/0180274 A1   Jun. 25, 2015

(30) Foreign Application Priority Data

Aug. 16, 2012 (CN) .................... 2012 2 0407020 U

(51) Int. Cl.
*H02J 7/00* (2006.01)
*H02J 7/34* (2006.01)
(Continued)

(52) U.S. Cl.
CPC ........ *H02J 7/34* (2013.01); *H02J 7/32* (2013.01); *H02N 3/00* (2013.01)

(58) Field of Classification Search
CPC .............. B60L 11/1824; B60L 11/1838; B60L 11/1842; H02J 3/008; H02J 3/32;
(Continued)

(56) References Cited

U.S. PATENT DOCUMENTS

2006/0028165 A1* 2/2006 Smith ............... H01L 35/30
320/101
2007/0296376 A1 12/2007 Marquet
(Continued)

FOREIGN PATENT DOCUMENTS

CN   101873082 A   10/2010
CN   201956736 U   8/2011
(Continued)

OTHER PUBLICATIONS

Partial Supplementary European Search Report in European application No. 13829680.1, mailed on Nov. 3, 2015.
(Continued)

*Primary Examiner* — Binh Tat
(74) *Attorney, Agent, or Firm* — Oppedahl Patent Law Firm LLC

(57) ABSTRACT

Disclosed is an energy-saving and environment-friendly device for a communication system equipment, the device includes: a thermoelectric conversion module, arranged on a surface of or in proximity to a high-power module of the communication system equipment, configured to convert thermal energy of the high-power module into electric energy; and an electric power storage device, connected directly to the thermoelectric conversion module or con-
(Continued)

nected thereto via a switch, configured to be charged using electric energy supplied by the thermoelectric conversion module.

19 Claims, 4 Drawing Sheets

(51) Int. Cl.
*H02N 3/00* (2006.01)
*H02J 7/32* (2006.01)

(58) Field of Classification Search
CPC .... H02J 3/381; H02J 5/005; H02J 7/32; H02J 7/0016; H02J 7/0081; H02J 7/34; H02J 7/345; H02J 7/35; H02J 7/355; Y02T 10/7005
USPC .................................................. 320/100–110
See application file for complete search history.

(56) References Cited

U.S. PATENT DOCUMENTS

| 2009/0066291 | A1* | 3/2009 | Tien ...................... H02J 7/0016 320/118 |
| 2014/0176041 | A1* | 6/2014 | Sun ......................... H01L 35/30 320/101 |

FOREIGN PATENT DOCUMENTS

| CN | 102437614 A | 5/2012 |
| CN | 202918218 U | 5/2013 |
| EP | 1568096 A1 | 8/2005 |
| JP | 61290670 A | 12/1986 |
| JP | 2000014026 A | 1/2000 |
| JP | 2004063384 A | 2/2004 |
| JP | 2004248358 A | 9/2004 |
| JP | 2004328561 A | 11/2004 |
| JP | 2005160290 A | 6/2005 |
| JP | 2007109819 A | 4/2007 |
| JP | 2007526740 A | 9/2007 |
| JP | 2009231655 A | 10/2009 |
| JP | 2010093983 A | 4/2010 |
| JP | 2011066965 A | 3/2011 |
| JP | 2011181880 A | 9/2011 |
| JP | 201262736 A | 3/2012 |
| KR | 100553418 B1 | 2/2006 |
| KR | 20080054857 A | 6/2008 |
| WO | 2004051786 A1 | 6/2004 |

OTHER PUBLICATIONS

Supplementary European Search Report in European application No. 13829680.1, mailed on Feb. 18, 2016.
International Search Report in international application No. PCT/CN2013/080146, mailed on Oct. 31, 2013.
English Translation of the Written Opinion of the International Search Authority in international application No. PCT/CN2013/080146, mailed on Oct. 31, 2013.

* cited by examiner

ENERGY-SAVING AND ENVIRONMENT-FRIENDLY DEVICE FOR COMMUNICATION SYSTEM EQUIPMENT

TECHNICAL FIELD

The disclosure relates to the technical field of wireless communication techniques, and in particular to an energy-saving and environment-friendly device for a communication system equipment, which converts thermal energy of the equipment into electric energy for use in the equipment.

BACKGROUND

With progresses in technologies and the development of economy, energies are increasingly consumed in various forms, a huge wireless communication system consists of many portions, among which a Radio Remote Unit (RRU) is an indispensable portion. The RRU includes an RRU equipment and an electric power storage system 1, as shown in FIG. 1.

At present, existing RRUs have an efficiency in an order of 30% or lower. Most energies are lost in the form of thermal energies due to technical limitations of power amplifiers. If the lost thermal energies can be collected and then recycled, we can move a great step towards an environment-friendly communication system advocated by ourselves.

SUMMARY

The disclosure is intended to provide an energy-saving and environment-friendly device for a communication system equipment so as to take full advantage of thermal energy produced by the communication system equipment and thus save energy.

An energy-saving and environment-friendly device for a communication system equipment according to embodiments of the disclosure includes:

a thermoelectric conversion module, arranged on a surface of or in proximity to a high-power module of the communication system equipment, configured to convert thermal energy of the high-power module into electric energy; and an electric power storage device, connected directly to the thermoelectric conversion module or connected to the thermoelectric conversion module via a switch, configured to be charged using electric energy supplied by the thermoelectric conversion module.

Preferably, the electric power storage device may include an inherent electric power storage module and an electric power storage system of the communication system equipment.

Preferably, the inherent electric power storage module and the electric power storage system may be connected respectively to the thermoelectric conversion module through the switch.

Preferably, the energy-saving and environment-friendly device may further include a control module configured to be connected respectively to the inherent electric power storage module, the electric power storage system and the switch.

Preferably, the communication system equipment may be a Radio Remote Unit (RRU) of a wireless communication system; the high-power module may be a power amplifier of the RRU; and the control module may be a mono-board system controller.

Preferably, the thermoelectric conversion module may consist of multiple electrolyte modules connected in a serial arrangement.

Preferably, each electrolyte module may be adhered to a corresponding radiating fin of the high-power module.

Preferably, each electrolyte module may include a positive electrode, a negative electrode, and a rechargeable electrolyte pie filled between the positive electrode and the negative electrode.

Preferably, the energy-saving and environment-friendly device may further include an outward electric power supply interface arranged in the inherent electric power storage module and configured to supply electric power outwards.

Preferably, the energy-saving and environment-friendly device may further include an electric power access interface configured to supply the electric power storage system with charged electric power.

Compared to the prior art, beneficial effects of embodiments of the disclosure lie in that the energy-saving and environment-friendly device can perform conversion efficiently, thermal energies in a wireless communication system equipment such as an RRU base station, into electric energies, recycle the thermal energies and store converted electric energies, and provide the equipment with desired electric energies.

In addition, in the technical solution of the disclosure, the added portion has advantages of low cost and low pollution, the energy-saving and environment-friendly device according to the disclosure reduces thermal energies released outwards by an equipment, and takes advantage of the thermal energies, thereby obtaining an energy-saving and environment-friendly low-carbon effect.

DETAILED DESCRIPTION

Preferred embodiments of the disclosure will be elaborated below with reference to accompanying drawings, and it should be appreciated that preferred embodiments described below are only used to describe and explain the disclosure instead of limiting it.

Figure 1:
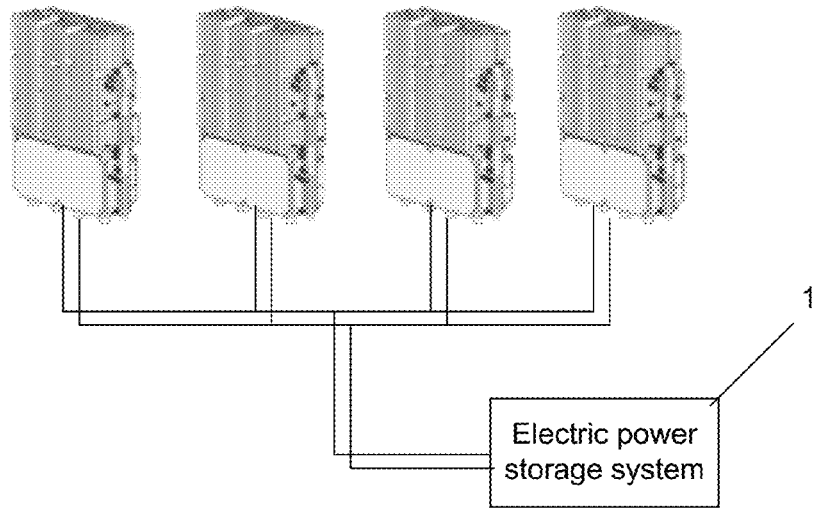
FIG. 1 is a schematic diagram of an energy-saving and environment-friendly device for a communication system equipment according to the prior art.
Figure 2:
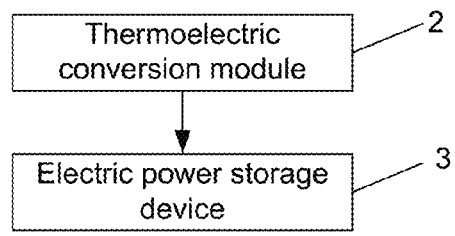
FIG. 2 is a principle diagram of an energy-saving and environment-friendly device for a communication system equipment according to a first embodiment of the disclosure.

FIG. 2 shows a principle diagram of an energy-saving and environment-friendly device for a communication system equipment according to a first embodiment of the disclosure, as shown in FIG. 2, the device includes:

a thermoelectric conversion module 2, arranged on a surface of or in proximity to a high-power module of the communication system equipment, and configured to convert thermal energy of the high-power module into electric energy; and an electric power storage device 3, connected directly to the thermoelectric conversion module 2 or connected to the thermoelectric conversion module 2 via a switch, and configured to be charged using electric energy supplied by the thermoelectric conversion module.

Most RRUs are placed outdoors, and thus thermal energies of multiple RRUs can be converted to electric energies for storage. The stored electric energies can be provided to the base station system to meet its own need for electric power supply or can be provided, through an electric power supply interface, to a system that needs outdoor lighting such as an outdoor advertisement and night lighting, and the stored electric energies can be input to the electric power storage device 3.

Figure 3:
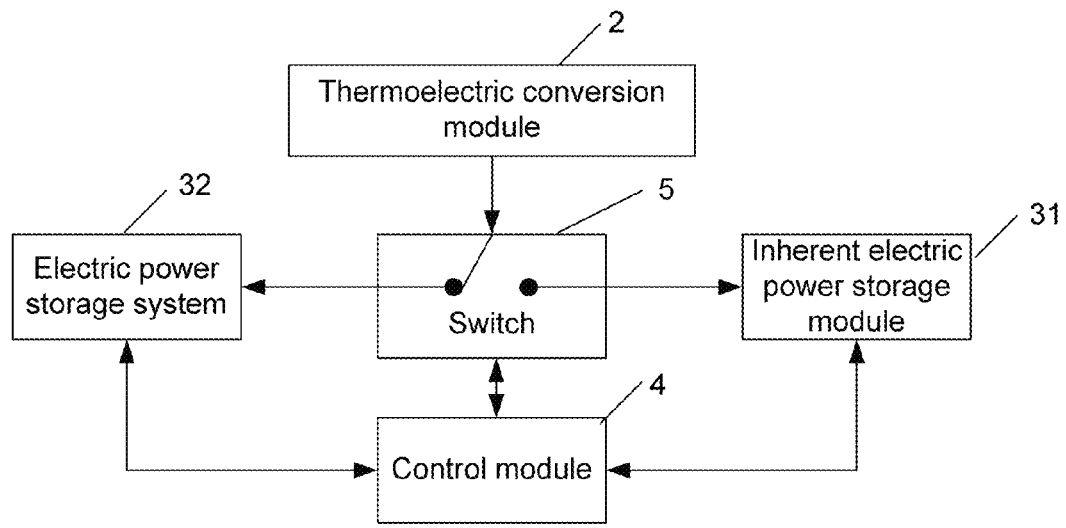
FIG. 3 is a principle diagram of an energy-saving and environment-friendly device for a communication system equipment according to a second embodiment of the disclosure.

FIG. 3 shows a principle diagram of an energy-saving and environment-friendly device for a communication system equipment according to a second embodiment of the disclosure, as shown in FIG. 3, the device includes:

the electric power storage device 3, including an inherent electric power storage module 31 and an electric power storage system 32 of the equipment.

Specifically, the inherent electric power storage module 31 and the electric power storage system 32 are connected respectively to the thermoelectric conversion module 2 via the switch 5.

A control module 4 connected respectively to the inherent electric power storage module 31, the electric power storage system 32 and the switch 5.

The control module 4 monitors in real time a state of charge of the inherent electric power storage module 31 or the electric power storage system 32, and controls the switch 5 to switch when detecting that the charging ends so that the electric power system 32 or the inherent electric power module 31 starts to charge.

Specifically, in the thermoelectric conversion module 2, a electrolyte material module is mounted on the outside of an existing heat source (power amplifier) of the RRU. Since the electrolyte material exhibits ion-conducting characteristic in certain conditions, under the heat source, such a material can convert thermal energies into electric energies, thus generating a voltage difference across two electrodes of the material. A mono-board system controller 41 is used to detect a charge capacity of the inherent electric power storage module 31, when the charge capacity of the inherent electric power storage module 31 is equal to or below half of its rated charge capacity, the inherent electric power storage module 31 starts to store electric power; and when the charge capacity of the inherent electric power storage module 31 is above half of its rated charge capacity, the mono-board system controller 41 notifies the electric power storage system 32 to store electric power. Thermal energies released by the power amplifier activate the ion-conducting characteristic of the electrolyte material and thus generate electric energies. Advantages of the method lie in: as long as there is a heat source, even though it has a relatively low temperature, thermal energies generated therefrom can be converted at any moment; the cost is low; there are plenty of such electrolyte materials in the nature which are commonly used in our daily life, for example, salt, sodium carbonate, sulfuric acid and the like; moreover, adding of the electrolyte material module into the device will not generate any exhaust gases or wastes, thereby complying with the call for energy conversation and emission reduction.

That is to say, the thermoelectric conversion module 2 implements the conversion of thermal energies to electric energies by converting thermal energies to electric energies through the electrolyte material under the heat source.

The inherent electric power storage module 31 has a higher-priority than that of the electric power storage system 32 in terms of electric power storage to implement electric power storage functionality. The inherent electric power storage module 31 is charged firstly, during charging, the mono-board system controller 41 monitors in real time the state of charge; when the charging ends, the switch 5 is immediately switched to the external electric power storage system 32; when electric power supply to an RRU is anomalous, the inherent electric power storage module 31 supplies electric power to the RRU.

When the quantity of electric power of the inherent electric power storage module 31 is lower than the quantity of electric power desired to be supplied to the RRU, the mono-board system controller 41 reports an inherent electric power storage capacity poor alert to prompt a user that the inherent electric power module 31 needs to be charged, then the user can switch the device through a background operation; when the outside needs power supply, an outwards electric power supply interface of the RRU can be connected so that the inherent electric power storage module 31 can enable outwards electric power supply; when the quantity of electric power of the inherent electric power storage module 31 is below half of the inherent electric power storage capacity, the mono-board system controller prompts the user that the inherent electric power module 31 needs to be charged.

Figure 4:
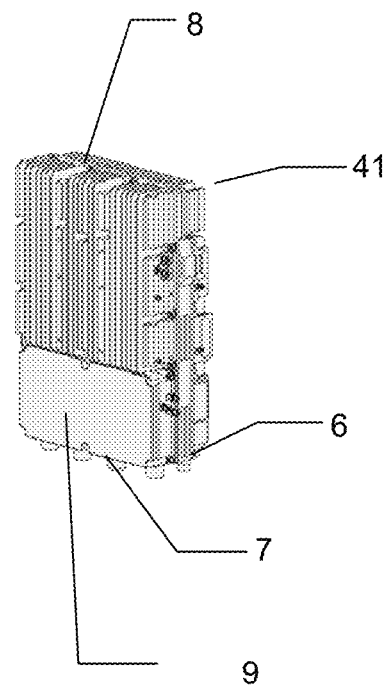
FIG. 4 is a schematic diagram showing application of, an energy-saving and environment-friendly device for a communication system equipment, in an RRU according to a second embodiment of the disclosure.

FIG. 4 is a schematic diagram showing application of, an energy-saving and environment-friendly device for a communication system equipment, in an RRU according to an embodiment of the disclosure, the device includes an outwards electric power supply interface 6 and an electric power storage system access interface 7.

The outward electric power supply interface 6 is arranged in the inherent electric power storage module 31 and configured to supply electric power outwards; the electric power access interface 7 is configured to supply the electric power storage system 32 with charging electric power.

Specifically, the outwards electric power supply interface 6 is available for use by users that need electric power in high altitude. The interface belongs to a universal interface, and can provide adaptable electric power supply and can also provide electric power supply through a Universal Serial BUS (USB) interface; the electric power storage access interface 7, after ensuring itself has sufficient stored electric power, stores electric energies converted from excessive thermal energies so as to facilitate electric power usage.

Figure 5:
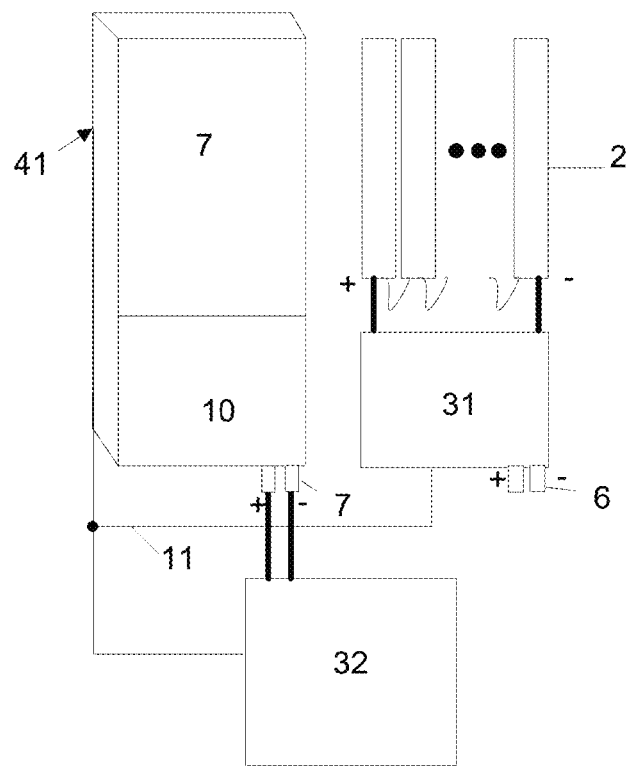
FIG. 5 is a schematic structural diagram showing an energy-saving and environment-friendly device in the RRU as shown in FIG. 4.

FIG. 5 is a schematic structural diagram showing an energy-saving and environment-friendly device applied to the RRU in FIG. 4. The device includes a thermoelectric conversion module 2, an inherent electric power storage module 31, an electric power storage system 32 and a mono-board system controller 41.

Specifically, the communication system equipment is an RRU of a wireless communication system, the high-power module 8 is a power amplifier of the RRU, the control module 4 is a mono-board system controller 41, and the mono-board system controller 41 controls the inherent electric power storage module 31 and the electric power storage system 32 through a control line 11.

When the whole communication system equipment is fully stored of energies, excessive energies need to be transferred to the electric power storage system 32, the mono-board system controller 41 monitors in real time an energy storage state of the communication system equipment and sends to the electric power storage system 32 an instruction to notify it to get ready for an electric power storage operation.

Regarding installation of the inherent electric power storage module 31, the inherent electric power storage module 31 is installed on a side of a duplexer 9, the thickness of the inherent electric power storage module 31 is kept consistent with that of a group of electrolyte materials so as to facilitate installation of the equipment.

Figure 6:
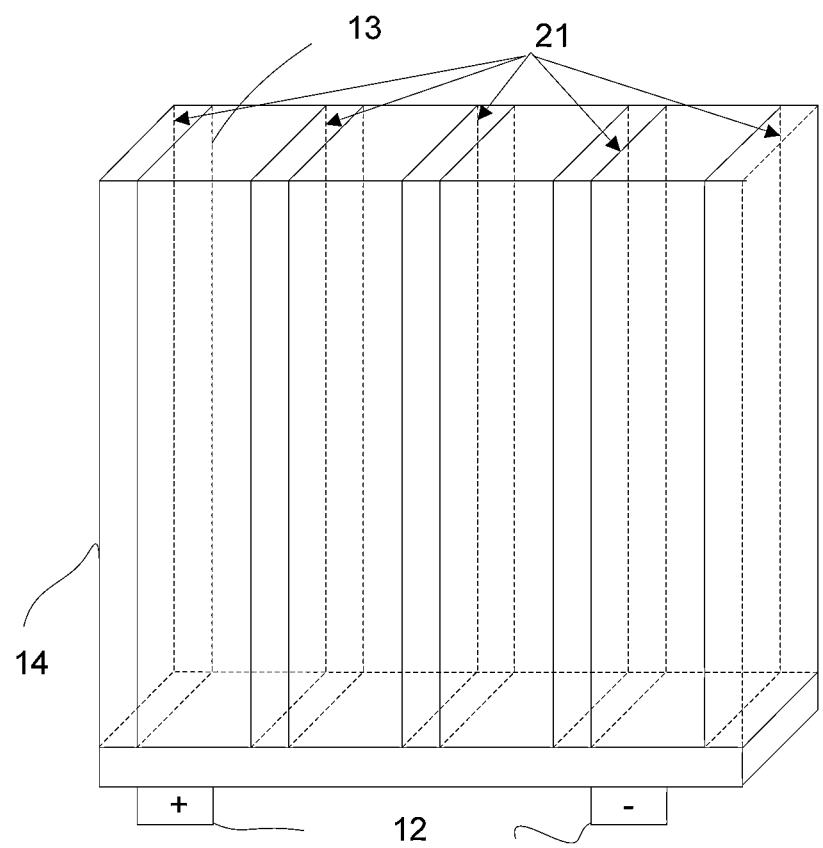
FIG. 6 is a schematic diagram of a thermoelectric conversion module according to an embodiment of the disclosure.

FIG. 6 is a schematic diagram of a thermoelectric conversion module according to an embodiment of the disclosure. As shown in FIG. 6, an electrolyte pie 21 is adhered to a radiating fin of the power amplifier 8; due to the temperature difference effect, each electrolyte contributes to the generation of potential difference, several groups of electrolytes are connected in serial according to their electric polarities, electrode access ports 12 are led out from two sides of the electrolyte module and then connected with the switch 5; one side of the switch 5 is connected to the inherent electric power storage module 31, and other side thereof is connected to the electric power storage system 32; the control of the switch 5 is implemented by the mono-board system controller 41; after detecting that the inherent electric power storage module 31 completes charging, the mono-board system controller 41 immediately switches the switch 5 so as to connect the switch 5 to the electric power storage system 32, and stores electric power after sending to the electric power storage system 32 an electric power delivery operation transmission instruction.

Figure 7:
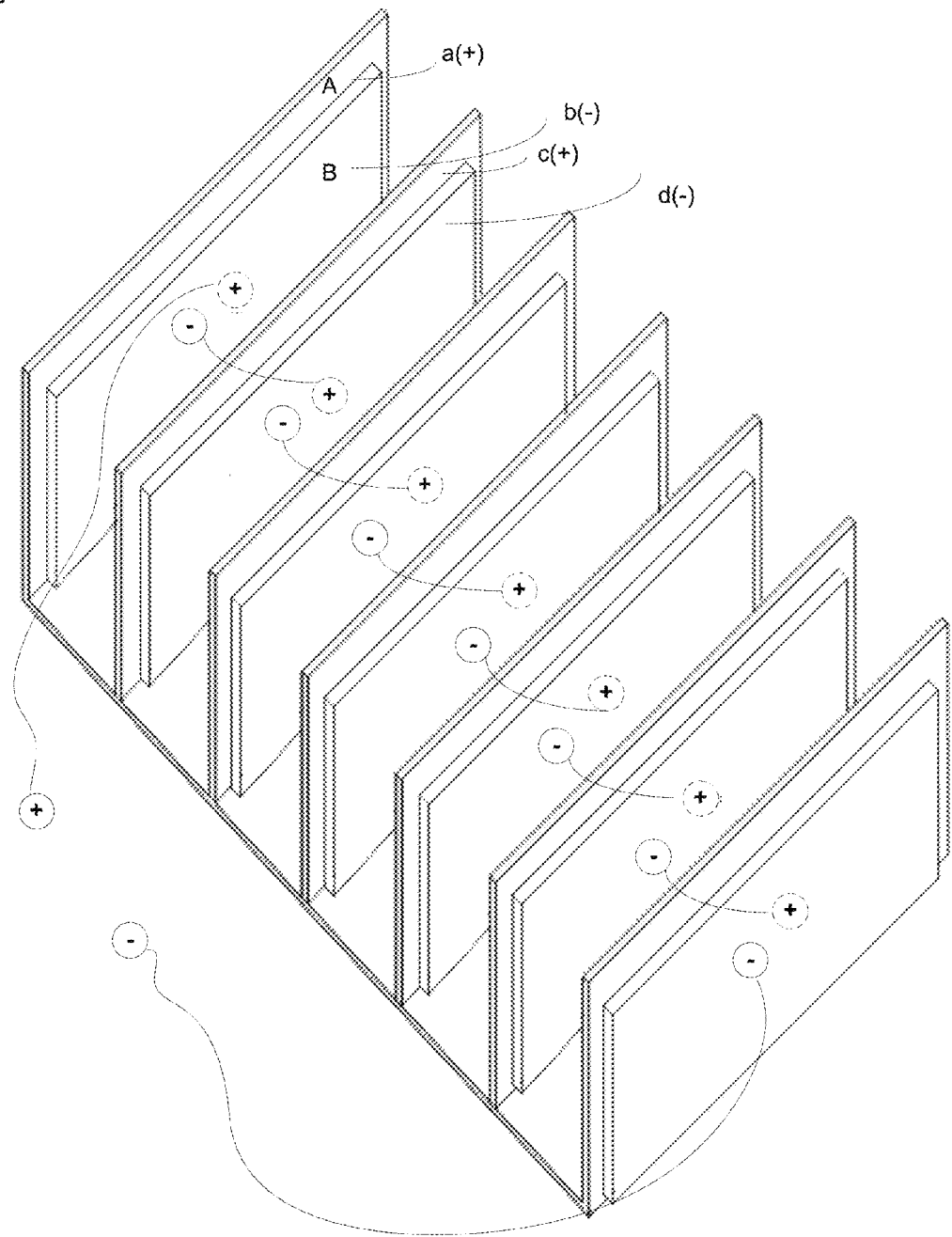
FIG. 7 is a schematic diagram showing implementation of a thermoelectric conversion module according to an embodiment of the disclosure.

FIG. 7 is a schematic diagram showing implementation of a thermoelectric conversion module according to an embodiment of the disclosure. As shown in FIG. 7, an electrode a (+) is firstly adhered to a face A of a radiating fin of the power amplifier 8, an electrode b (−) is adhered to an inner face B of the device, and a rechargeable electrolyte pie 21 is filled between a and b; according to a same method, an electrode c (+) is adhered to a face of a next radiating fin, an electrode d (−) is adhered to an inner face of the device, and a rechargeable electrolyte pie 21 is filled between c and d, and an electrolyte group is formed through repeating the above arrangement; an anode (+) of a previous stage is connected to a cathode (−) of a next stage, wherein the a (+) of the first stage and an n (−) of the last stage are used as charging electrodes so as to provide charging electrodes to the inherent electric power storage module 31 and the electric power storage system 32.

In addition, as shown in FIG. 6 and FIG. 7, the thermoelectric conversion module 2 consists of multiple electrolyte modules connected in a serial arrangement; each electrolyte module is adhered to a corresponding radiating fin of the high-power module; each electrolyte module includes a positive electrode, a negative electrode, and a rechargeable electrolyte pie 21 filled between the positive electrode and the negative electrode.

The work flow of the device is as below: after an RRU operates, a power amplifier 8 releases plenty of thermal energies, which serve as a heat source that activates the motion of ions in the electrolyte, and a potential difference is thus generated between electrodes.

To sum up, the energy-saving and environment-friendly device according to the disclosure can convert efficiently, thermal energies in a wireless communication system equipment such as an RRU base station, into electric energies, recycle the thermal energies and store converted electric energies, and provide an internal or external equipment with desired electric energies. In addition, the energy-saving and environment-friendly device according to the disclosure reduces thermal energies released outwards by an equipment, and takes advantage of the thermal energies, thereby obtaining an energy-saving and environment-friendly low-carbon effect.

Although the disclosure is elaborated herein, the disclosure is not limited to the above description, and those skilled in the art can make various modifications according to the principle of the disclosure. Therefore, it will be appreciated that modifications made in accordance with the principle of the disclosure should fall within the scope of protection of the disclosure.

The invention claimed is:

1. An energy-saving and environment-friendly device for a communication system equipment, comprising:
   a thermoelectric conversion module, arranged on a surface of or in proximity to a high-power module of the communication system equipment, and configured to convert thermal energy of the high-power module into electric energy; and
   an electric power storage device, connected directly to the thermoelectric conversion module or connected to the thermoelectric conversion module via a switch, and configured to be charged using electric energy supplied by the thermoelectric conversion module;
   wherein the electric power storage device comprises an inherent electric power storage module of the communication system equipment and an electric power storage system, when charge capacity of the inherent electric power storage module is equal to or below half of its rated charge capacity, the inherent electric power storage module starts to store electric power; and when charge capacity of the inherent electric power storage module is above half of its rated charge capacity, the electric power storage system is notified to store electric power.

2. The energy-saving and environment-friendly device according to claim 1, wherein
   the inherent electric power storage module and the electric power storage system are connected respectively to the thermoelectric conversion module via the switch.

3. The energy-saving and environment-friendly device according to claim 1, further comprising: a control module, configured to be connected respectively to the inherent electric power storage module, the electric power storage system and the switch.

4. The energy-saving and environment-friendly device according to claim 3,
   wherein the communication system equipment is a Radio Remote Unit (RRU) of a wireless communication system;
   wherein the high-power module is a power amplifier of the RRU; and
   wherein the control module is a mono-board system controller.

5. The energy-saving and environment-friendly device according to claim 1, wherein the thermoelectric conversion module consists of a plurality of electrolyte modules connected in series.

6. The energy-saving and environment-friendly device according to claim 5, wherein each electrolyte module is adhered to a corresponding radiating fin of the high-power module.

7. The energy-saving and environment-friendly device according to claim 6, wherein each electrolyte module comprises a positive electrode, a negative electrode, and a rechargeable electrolyte pie filled between the positive electrode and the negative electrode.

8. The energy-saving and environment-friendly device according to claim 1, further comprising an outward electric power supply interface arranged in the inherent electric power storage module and configured to supply electric power outwards.

9. The energy-saving and environment-friendly device according to claim 1, further comprising an electric power access interface configured to supply the electric power storage system with charging electric power.

10. The energy-saving and environment-friendly device according to claim 3, wherein the high-power module in the energy-saving and environment-friendly device comprises the power amplifier of the RRU, a mono-board of the RRU, a duplexer of the RRU and a power supply of the RRU, at least one of which is a high heat-dissipation arrangement, and
wherein the high-power module comprises radiating fin parts and non-radiating-fin parts.

11. The energy-saving and environment-friendly device according to claim 10, wherein each electrolyte module is adhered to the high-power module, including the radiating fin parts and the non-radiating-fin parts.

12. The energy-saving and environment-friendly device according to claim 2, further comprising an outward electric power supply interface arranged in the inherent electric power storage module and configured to supply electric power outwards.

13. The energy-saving and environment-friendly device according to claim 3, further comprising an outward electric power supply interface arranged in the inherent electric power storage module and configured to supply electric power outwards.

14. The energy-saving and environment-friendly device according to claim 4, further comprising an outward electric power supply interface arranged in the inherent electric power storage module and configured to supply electric power outwards.

15. The energy-saving and environment-friendly device according to claim 5, further comprising an outward electric power supply interface arranged in the inherent electric power storage module and configured to supply electric power outwards.

16. The energy-saving and environment-friendly device according to claim 2, further comprising an electric power access interface configured to supply the electric power storage system with charging electric power.

17. The energy-saving and environment-friendly device according to claim 3, further comprising an electric power access interface configured to supply the electric power storage system with charging electric power.

18. The energy-saving and environment-friendly device according to claim 4, further comprising an electric power access interface configured to supply the electric power storage system with charging electric power.

19. The energy-saving and environment-friendly device according to claim 5, further comprising an electric power access interface configured to supply the electric power storage system with charging electric power.

* * * * *